United States Patent
Ren et al.

(10) Patent No.: US 10,404,127 B2
(45) Date of Patent: Sep. 3, 2019

(54) MOTOR HAVING INTERPHASE INSULATION PAPER AT COIL END, AND METHOD FOR PRODUCING MOTOR

(71) Applicant: FANUC CORPORATION, Yamanashi (JP)

(72) Inventors: Gang Ren, Yamanashi (JP); Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 199 days.

(21) Appl. No.: 15/478,030

(22) Filed: Apr. 3, 2017

(65) Prior Publication Data

US 2017/0294816 A1 Oct. 12, 2017

(30) Foreign Application Priority Data

Apr. 7, 2016 (JP) ................... 2016-077453

(51) Int. Cl.
| H02K 3/34 | (2006.01) |
| H02K 1/16 | (2006.01) |
| H02K 3/30 | (2006.01) |
| H02K 15/10 | (2006.01) |
| H02K 3/38 | (2006.01) |

(52) U.S. Cl.
CPC ............. *H02K 3/34* (2013.01); *H02K 1/16* (2013.01); *H02K 3/30* (2013.01); *H02K 3/38* (2013.01); *H02K 15/10* (2013.01)

(58) Field of Classification Search
CPC .. H02K 3/00; H02K 3/30; H02K 3/32; H02K 3/34; H02K 3/38; H02K 3/52; H02K 3/522; H02K 15/00; H02K 15/02; H02K 15/04; H02K 15/10; H02K 15/105

See application file for complete search history.

(56) References Cited

U.S. PATENT DOCUMENTS

2013/0127290 A1* 5/2013 Matsubara ............... H02K 3/38
310/208

FOREIGN PATENT DOCUMENTS

| JP | H07298530 A | 11/1995 |
| JP | 2005-110492 A | 4/2005 |
| JP | 2007-060819 A | 3/2007 |

OTHER PUBLICATIONS

An Office Action; "Notification of Reasons for Refusal" mailed by the Japanese Patent Office dated Mar. 27, 2018, which corresponds to Japanese Patent Application No. 2016-077453 and is related to U.S. Appl. No. 15/478,030 with English language translation.
An Office Action mailed by the Japanese Patent Office dated Oct. 9, 2018, which corresponds to Japanese Patent Application No. 2016-077453 and is related to U.S. Appl. No. 15/478,030 with English translation.

* cited by examiner

*Primary Examiner* — Tran N Nguyen
(74) *Attorney, Agent, or Firm* — Studebaker & Brackett PC

(57) ABSTRACT

Provided are a motor and method for producing the motor that automatically insert interphase insulation paper. Interphase insulation paper (7) has a parting strip (8) that partitions the boundary between windings (5) that are adjacent in the circumferential direction when inserted into coil ends (6). The parting strip (8) is sandwiched between the adjacent windings (5, 5).

2 Claims, 14 Drawing Sheets

MOTOR HAVING INTERPHASE INSULATION PAPER AT COIL END, AND METHOD FOR PRODUCING MOTOR

This application is based on and claims the benefit of priority from Japanese Patent Application No. 2016-077453, filed on 7 Apr. 2016, the content of which is incorporated herein by reference.

BACKGROUND OF THE INVENTION

Field of the Invention

The present invention relates to a motor having interphase insulation paper at coil ends, and a method for producing the motor.

Related Art

Generally, an electric potential is applied to the winding of a motor. If the input voltage is three-phase 400 Vrms, for example, the electric potential applied to the winding of the motor will reach 560 Vp. Furthermore, when considering so much as the surge voltage in inverter driving, the electric potential applied to the winding of a motor reaches up to twice this at 1120 Vp. On the other hand, the withstand voltage of an enamel wire used in the winding is on the order of 800 Vp, generally. For this reason, it is necessary to enhance the insulation by inserting interphase insulation paper between the winding of one phase and the winding of a different phase.

However, the operation of inserting interphase insulation paper to the coil end is generally performed by manual labor, and thus the cost increases.

In order to address this, a method has been proposed of inserting the windings for three-phase current in 3 passes, and after the insertion of the first pass phase and second pass phase thereof, automatically inserting the interphase insulation paper in which an insulation part of the coil end on a winding insertion side and an insulation part of the coil end on the counter-insertion side connect in an H-shape using a dedicated upper tool (refer to Patent Document 1).

In this case, the reason for connecting the insulation part of the coil end on a winding insertion side and an insulation part of the coil end on the counter-insertion side is in order to fix so that the interphase insulation paper does not move during winding insertion after the interphase insulation paper insertion.

Patent Document 1: Japanese Unexamined Patent Application, Publication No. 2007-60819

SUMMARY OF THE INVENTION

However, there is a problem in that, with the method of automatically inserting the insulation paper in which the insulation part of the coil end on a winding insertion side and an insulation part of the coil end on the counter-insertion side connect in an H-shape using a dedicated upper tool, the connecting part of the interphase insulation paper remains inside the slot, and thus the space factor of the winding declines.

The present invention has the object of providing a motor having interphase insulation paper at the coil end, and a method for producing the motor that can automatically insert the interphase insulation paper to the coil end without causing the space factor of the winding to decline.

According to a first aspect of the present invention, a motor (for example, the motor 10 described later) includes: a stator core (for example, the stator core 1 described later) laminated with an electromagnetic steel sheet (for example, the electromagnetic steel sheet 2 described later), and having a plurality of slots (for example, the slot 3 described later); and windings (for example, the winding 5 described later) that is inserted in a winding distribution of three phases into the slots, in which interphase insulation paper (for example, the interphase insulation paper 7 described later) is inserted into a coil end (for example, the coil end 6 described later), in which the interphase insulation paper has at least one parting strip (for example, the parting strip 8 described later) that partitions a boundary between windings that are adjacent in a circumferential direction when inserted into the coil end, and in which the parting strip is sandwiched between the windings that are adjacent.

According to a second aspect of the present invention, in the motor as described in the first aspect, the interphase insulation paper may have a connecting part (for example, the connecting part 9 described later)) that connects with another interphase insulation paper (for example, the other interphase insulation paper 7 described later) that is adjacent thereto in the circumferential direction when inserted in the coil end.

According to a third aspect of the present invention, in the motor as described in the first aspect, the interphase insulation paper may be separated into each phase.

According to a fourth aspect of the present invention, in a method for producing a motor (for example, the motor 10 described later) that includes a stator core (for example, the stator core 1 described later) laminated with an electromagnetic steel sheet (for example, the electromagnetic steel sheet 2 described later), and having a plurality of slots (for example, the slot 3 described later); and windings (for example, the winding 5 described later) that are inserted in the slots in a winding distribution of three phases consisting of two layers of an outer side and an inner side, and inserted to be divided into two of an outer winding and an inner winding, in which interphase insulation paper (for example, the interphase insulation paper 7 described later) is inserted into a coil end (for example, the coil end 6 described later), the method includes: a first step of inserting the outer winding into slots of the stator core; a second step of inserting interphase insulation paper, shaped so as to match the coil end of each phase formed in the first step, into the coil end of each phase, the interphase insulation paper having a parting strip (for example, the parting strip 8 described later) between windings that are adjacent in a circumferential direction when inserted in the coil end; a third step of fixing the interphase insulation paper by the windings being collapsed in a circumferential direction by way of shaping the coil end, thereby pinching the parting strip by the windings that are adjacent; and a fourth step of inserting the inner winding into the slots of the stator core.

According to a fifth aspect of the present invention, in a method for producing a motor (for example, the motor 10 described later) that includes a stator core (for example, the stator core 1 described later) laminated with an electromagnetic steel sheet (for example, the electromagnetic steel sheet 2 described later), and having a plurality of slots (for example, the slot 3 described later); and windings (for example, the winding 5 described later) that are inserted in the slots in a winding distribution of three phases consisting of two layers of an outer side and an inner side, and inserted to be divided into two of an outer winding and an inner winding, in which interphase insulation paper (for example, the interphase insulation paper 7 described later) is inserted into a coil end (for example, the coil end 6 described later), the method includes: a first step of inserting the outer winding into slots of the stator core; a second step of collapsing the coil end of each phase formed in the first step greatly to an outer side, and inserting the inner winding into the slots of the stator core; a third step of inserting the interphase insulation paper shaped so as to match the coil end of each phase formed in the first step and the second step, and having a parting strip (for example, the parting strip 8 described later) between the windings that are adjacent in the circumferential direction when inserted in the coil end, in both the outer winding and the inner winding of the coil end of each phase; and a fourth step of fixing the interphase insulation paper by the windings being collapsed in the circumferential direction by way of shaping the coil ends, thereby pinching the parting strip by the windings that are adjacent.

According to the present invention, it is possible to automatically insert interphase insulation paper in coil ends, without causing the space factor of windings to decline.

DETAILED DESCRIPTION OF THE INVENTION

Figure 1:
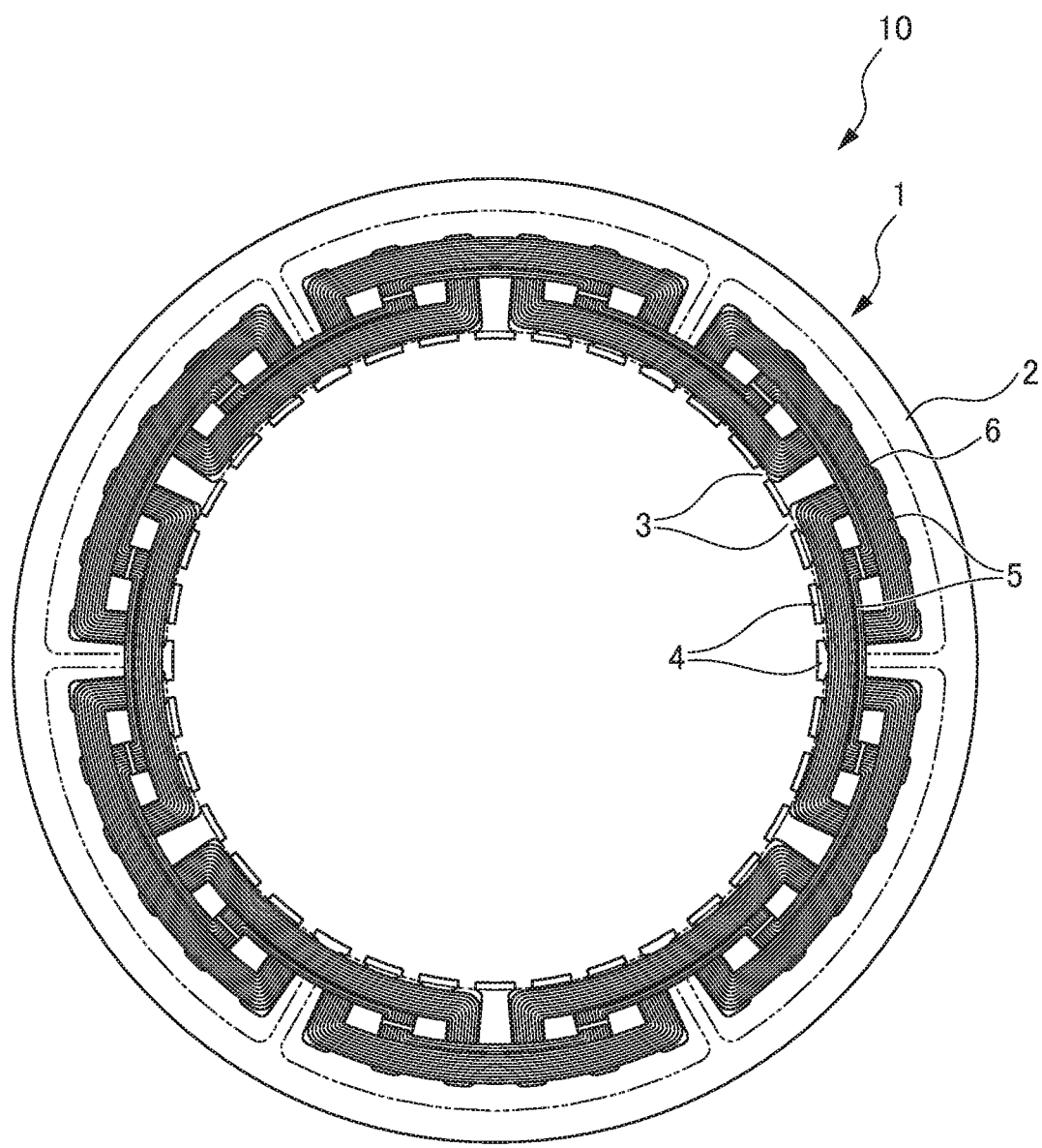
FIG. 1 is a front view showing a motor according to an embodiment, illustrating so that an outer winding and inner winding are clearly demarcated by viewing from a shaft-line direction, and in which interphase insulation paper is omitted from illustration.

Hereinafter, an embodiment of the present invention will be explained while referencing the drawings. First, a motor according to an embodiment of the present invention will be explained. FIG. 1 is a view showing a motor 10 according to the present embodiment, with the rotor being omitted from illustration. FIG. 1 illustrates so that an outer winding and an inner winding are clearly demarcated by viewing from a shaft-line direction, and omits illustration of the interphase insulation paper.

As shown in FIG. 1, the motor 10 according to the present embodiment includes a stator core 1 laminated with an electromagnetic steel sheet 2, and having a plurality of slots 3 and teeth 4, and windings 5 inserted into the slots 3 in the distributed winding of three phases. The windings 5 are made into distributed windings of three phases consisting of the two layers of the outer and inner side, and are inserted into the slots 3 by dividing into the two of an outer winding and inner winding. Interphase insulation paper 7 (refer to FIG. 2) is inserted into the coil ends 6 formed thereby.

Figure 10:
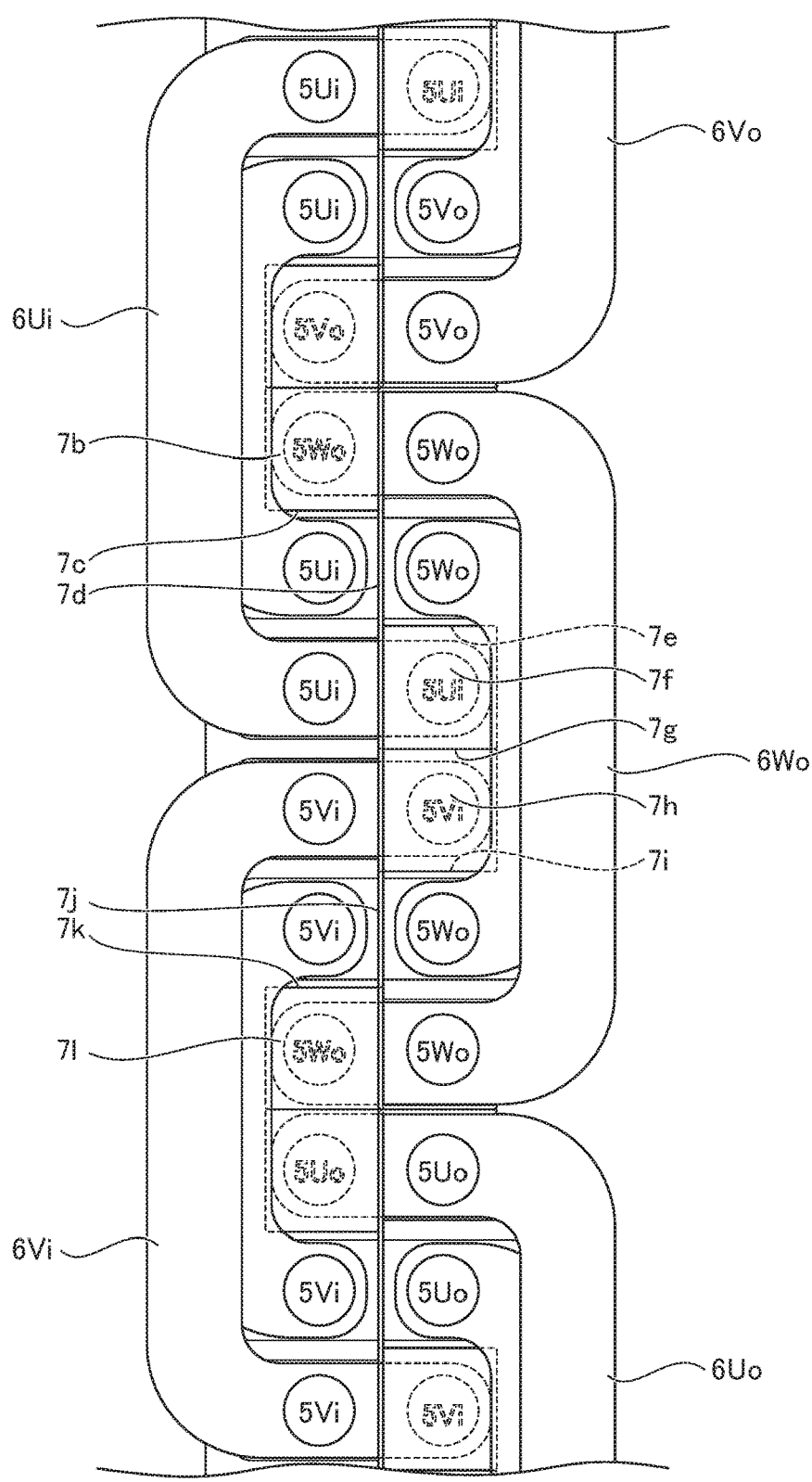
FIG. 10 is a view schematically showing the coil ends of FIG. 9.

More specifically, the motor 10 according to the present embodiment is configured by a large coils and small coils due to arranging the windings in 36 slots with 8 poles at 1.5 slot pitch. As shown in FIG. 10, the U-phase coil 5U is configured by a U-phase large coil 5U+5U and a U-phase small coil 5U. When arranged at the outer side, the U-phase coil 5U is configured by the outer U-phase large coil 5Uo+5Uo and the outer U-phase small coil 5Uo. When arranged at the inner side, the U-phase coil is configured by the inner U-phase large coil 5Ui+5Ui and the inner U-phase small coil 5Ui. The U-phase coil end 6U arranged at the outer side is an outer U-phase coil end 6Uo. The U-phase coil end 6U arranged at the inner side is an inner U-phase coil end 6Ui.

Similarly, the V-phase coil 5V is configured by a V-phase large coil 5V+5V and a V-phase small coil 5V. When arranged at the outer side, the V-phase coil 5V is configured by the outer V-phase large coil 5Vo+5Vo and the outer V-phase small coil 5Vo. When arranged at the inner side, the V-phase coil 5V is configured by the inner V-phase large coil 5Vi+5Vi and the inner V-phase small coil 5Vi. The V-phase coil end 6V arranged at the outer side is an outer V-phase coil end 6Vo. The V-phase coil end 6V arranged at the inner side is an inner V-phase coil end 6Vi.

In addition, a W-phase coil 5W is configured by a W-phase large coil 5W+5W and a W-phase small coil 5W. When arranged at the outer side, the W-phase coil 5W is configured by an outer W-phase larger coil 5Wo+5Wo, and an outer W-phase small coil 5Wo. When arranged at the inner side, the W-phase coil 5W is configured by an inner W-phase larger coil 5Wi+5Wi, and an inner W-phase small coil 5Wi. The W-phase coil end 6W arranged at the outer side is an outer W-phase coil end 6Wo. The W-phase coil end 6W arranged at the inner side is an inner W-phase coil end 6Wi.

Figure 2:
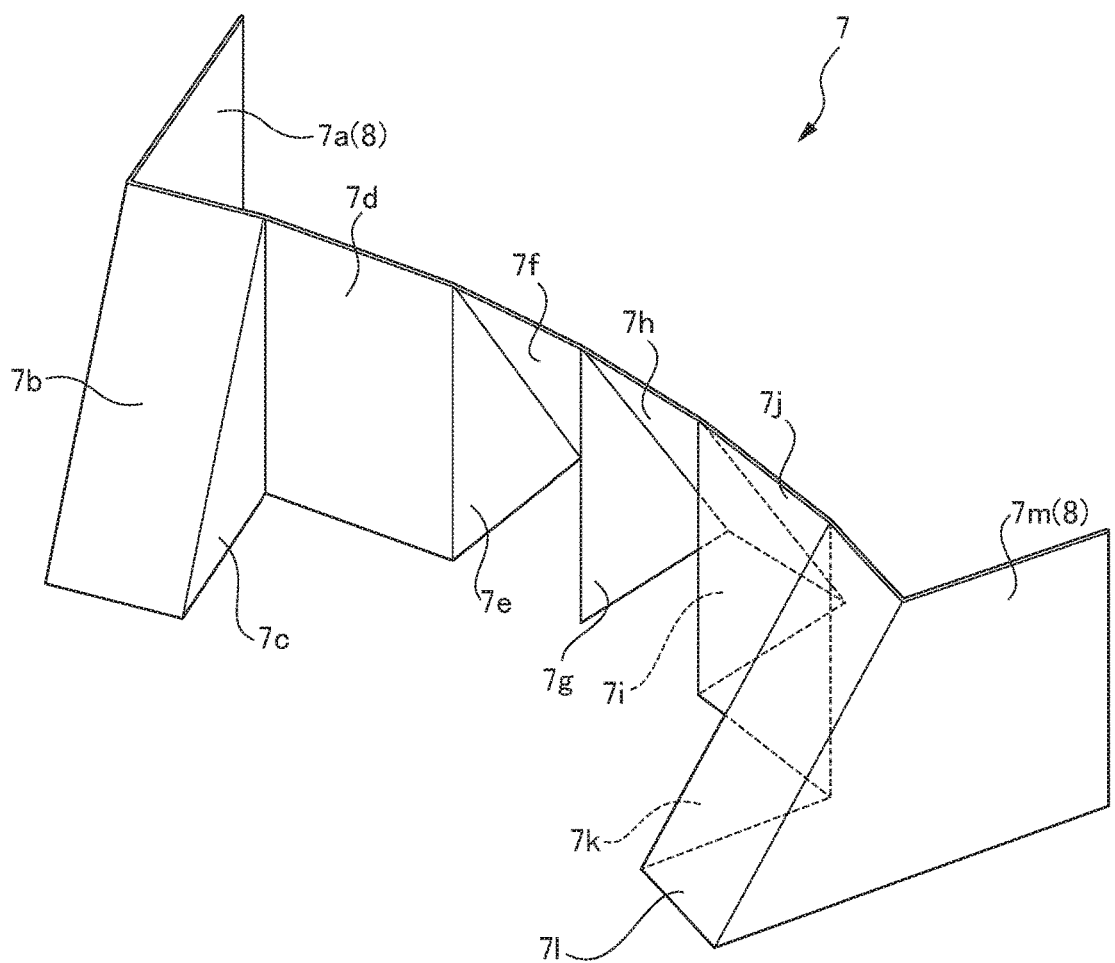
FIG. 2 is a perspective view showing the interphase insulation paper used in the motor of FIG. 1.

The interphase insulation paper 7 is created by bending and shaping the required number of sheets of insulation paper or pasting together and shaping as necessary. The shape of the interphase insulation paper 7 is configured by thirteen faces 7a to 7m as shown in FIG. 2. More specifically, the first face 7a is positioned at an end in the circumferential direction. The first face 7a, when the interphase insulation paper 7 is arranged at the coil end 6, is a vertical face that rises vertically from the end face of the tooth 4 of the stator core 1 up to a predetermined height. The first face 7a extends a predetermined length in the radial direction of the stator core 1 along the tooth 4. The lower edge of the first face 7a extends linearly to touch on an end face of the tooth 4. The upper edge of the first face 7a extends linearly in parallel with the lower edge. The back edge of the first face 7a linearly extends vertically from the end face of the tooth 4. The front edge of the first face 7a linearly extends obliquely forwards from top towards bottom. The thirteenth face 7m positioned at the other end in the circumferential direction of the stator core 1 is configured similarly to the first face 7a.

The second face 7b is a sloped face that is bent so as to be substantially orthogonal to the front edge of the first face 7a. The second face 7b extends to the front edge of the first face 7a at a left edge. The second face 7b has a width substantially equal to the pitch of the teeth 4 (pitch of slots 3) of the stator core 1. The second face 7b is configured in a rectangular shape. The twelfth face 7l on another end side in the circumferential direction of the stator core 1 is configured similarly to the second face 7b, except for the point of the bending direction relative to the front edge of the thirteenth face 7m being reversed. The twelfth face 7l extends to the front edge of the thirteenth face 7m at the right edge.

The third face 7c is a vertical face bent so as to be substantially orthogonal to the right edge of the second face 7b. The third face 7c extends to the right edge of the second face 7b at the front edge. The third face 7c is configured in a triangular shape. The lower edge of the third face 7c extends linearly to touch on the end face of the tooth 4 of the stator core 1. The back edge of the third face 7c linearly extends vertically from the end face of the tooth 4. The eleventh face 7k at the other end side in the circumferential direction of the stator core 1 is configured similarly to the third face 7c, except for the point of the bending direction relative to the front edge of the twelfth face 7l being reversed. The eleventh face 7k extends to the left edge of the twelfth face 7l at the front edge.

The fourth face 7d is a vertical face bent so as to be substantially orthogonal to the back edge of the third face 7c. The fourth face 7d extends to the back edge of the third face 7c at the left edge. The fourth face 7d has a width that is substantially equal to the pitch of the teeth 4 (pitch of slots 3) of the stator core 1. The fourth face 7d is configured in a rectangular shape. The tenth face 7j at the other end side in the circumferential direction of the stator core 1 is configured similarly to the fourth face 7d, except for the point of the bending direction relative to the back edge of the eleventh face 7k being reversed. The tenth face 7j extends to the back edge of the eleventh face 7k at the right edge.

The fifth face 7e is a vertical face that is bent so as to be substantially orthogonal to the right edge of the fourth face 7d. The fifth face 7e extends to the right edge of the fourth face 7d at the front edge. The fifth face 7e is configured in a triangular shape. The lower edge of the fifth face 7e extends linearly to touch on the end face of the tooth 4 of the stator core 1. The back edge of the fifth face 7e extends linearly backwards to slope from up towards down. The ninth face 7i at the other end side in the circumferential direction of the stator core 1 is configured similarly to the fifth face 7e, except for the point of the bending direction relative to the left edge of the tenth face 7j being reversed. The ninth face 7i extends to the left edge of the tenth face 7j at the front edge.

The sixth face 7f is a sloped face that is bent so as to be substantially orthogonal to the back edge of the fifth face 7e. The sixth face 7f extends to the back edge of the fifth face 7e at the left edge. The first face 7f has a width substantially equal to the pitch of the teeth 4 (pitch of slots 3) of the stator core 2. The sixth face 7f is configured in a rectangular shape. The inclination angle of the sixth face 7f sloping obliquely rearwards from top to bottom is equal to the inclination angle of the second face 7b sloping obliquely forwards from top to bottom. The eighth face 7h at the other end side in the circumferential direction of the stator core 1 is configured similarly to the sixth face 7f, except for the point of the bending direction relative to the back edge of the ninth face 7i being reversed. The eighth face 7h extends to the back edge of the ninth face 7i at a right edge.

The seventh face 7g is a vertical face bent so as to be substantially orthogonal to the right edge of the sixth face 7f. The seventh face 7g extends to the right edge of the sixth face 7f at a back edge. The seventh face 7g also is a vertical face bent so as to be substantially orthogonal to the left edge of the eighth face 7h. The seventh face 7g extends also to the left edge of the eighth face 7h at a back edge. The seventh face 7g is configured in a triangular shape. The lower edge of the seventh face 7g extends linearly to touch on the end face of the tooth 4 of the stator core 1. The front edge of the seventh face 7g linearly extends vertically from the end face of the tooth 4.

The interphase insulation paper 7 configured in the above described way has at least one parting strip 8 that partitions the boundary of adjacent windings 5, 5 in the circumferential direction when inserted in the coil end 6. At least part of the parting strip 8 is sandwiched between the adjacent windings 5, 5. This will be described in detail in the explanation of the method for producing a motor described later.

Next, first and second embodiments relating to methods for producing a motor of the present invention will be explained, respectively. First, the method for producing a motor according to the first embodiment will be explained. The motor produced by the method for producing a motor according to the first embodiment is the motor 10 explained above. In other words, the motor 10 includes the stator core 1 laminated with an electromagnetic steel sheet 2, and having a plurality of slots 3 and teeth 4, and the windings 5 inserted as the distributed windings of three phases into the slots 3. The windings 5 are made into the distributed windings of three phases consisting of the two layers of the outer side and inner side, and are inserted into the slots 3 by dividing into the two of an outer winding and inner winding. The interphase insulation paper 7 is inserted into the coil ends 6 formed thereby.

As shown in FIGS. 1 to 10, the method for producing a motor according to the first embodiment includes: a first step of inserting an outer winding 5 into the slots 3 of the stator core 1; a second step of inserting the interphase insulation paper 7 that is shaped so as to match the coil ends 6 of each phase formed in the first step, into the coil end 6 of each phase, the interphase insulation paper 7 having a parting strip 8 between windings 5, 5 that are adjacent in the circumferential direction when inserted in the coil end 6; a third step of fixing the interphase insulation paper 7 by the windings 5 being collapsed in the circumferential direction by way of shaping the coil end 6 and pinching the parting strip 8 by the windings 5, 5 that are adjacent; and a fourth step of inserting the inner winding 5 into the slots 3 of the stator core 1.

Figure 3:
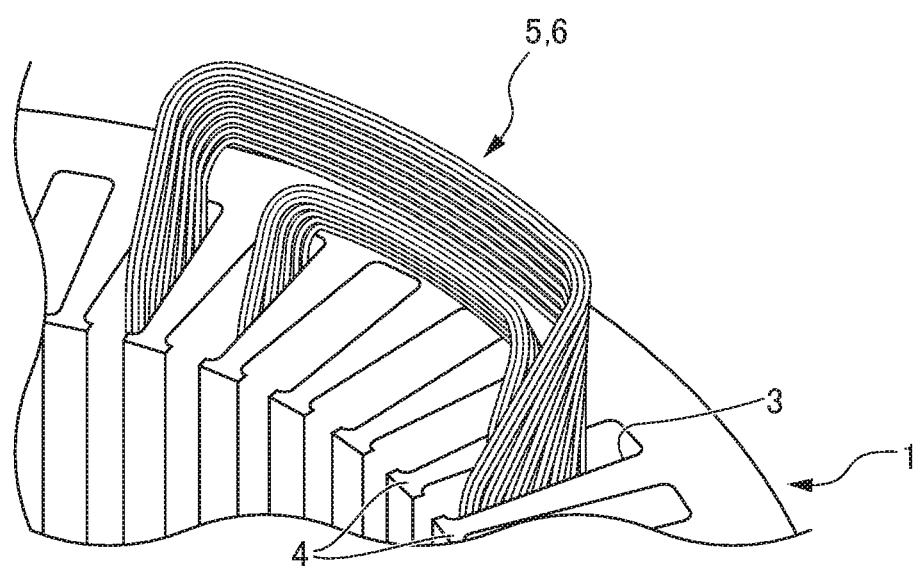
FIG. 3 is a perspective view showing a coil end of the outer winding in a first embodiment of the method for producing the motor of FIG. 1.
Figure 4:
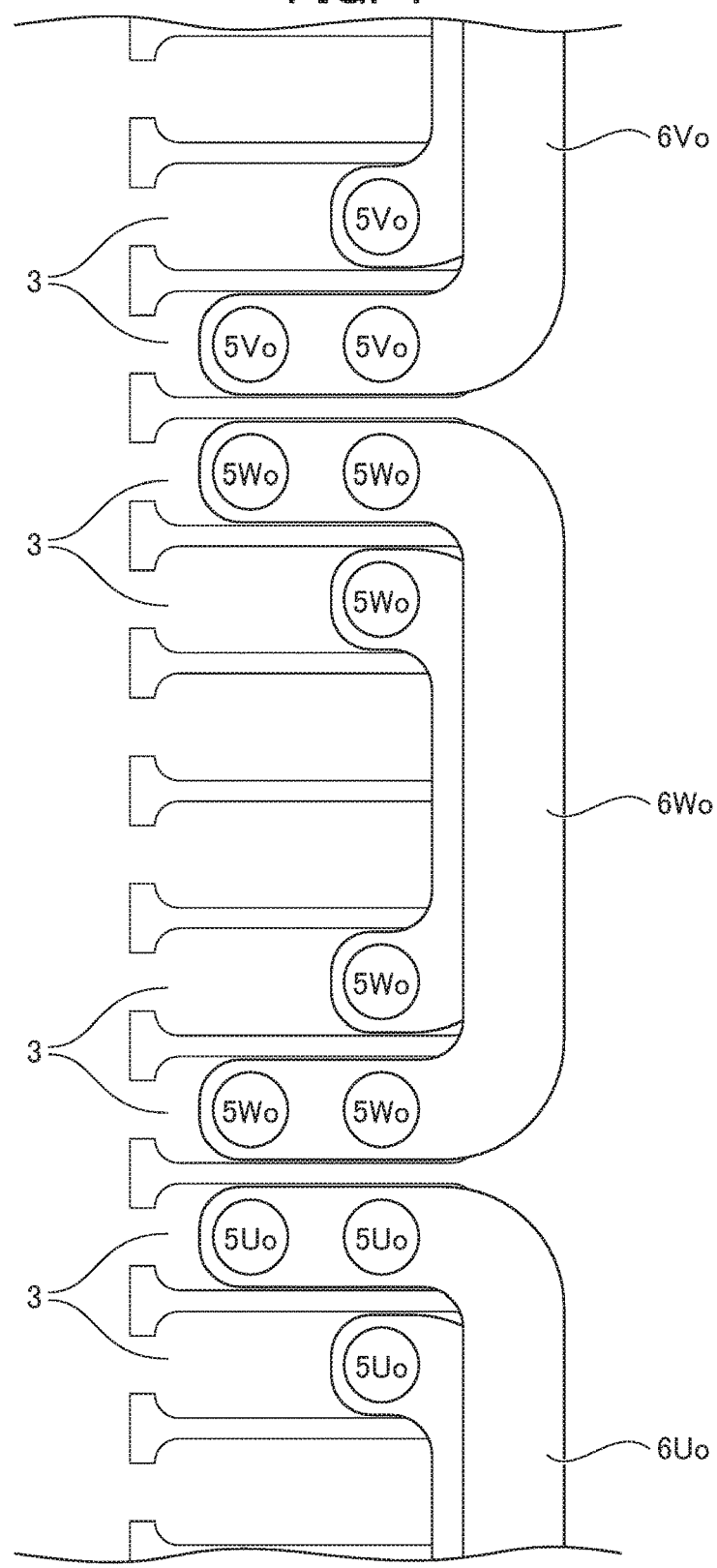
FIG. 4 is a view schematically showing the coil end of FIG. 3.

More specifically, in the first step, as shown in FIGS. 3 and 4, the outer U-phase large coil 5Uo+5Uo and outer U-phase small coil 5Uo, the outer V-phase large coil 5Vo+5Vo and outer V-phase small coil 5Vo, and the outer W-phase large coil 5Wo+5Wo and outer W-phase small coil 5Wo are inserted in the slots 3.

Figure 5:
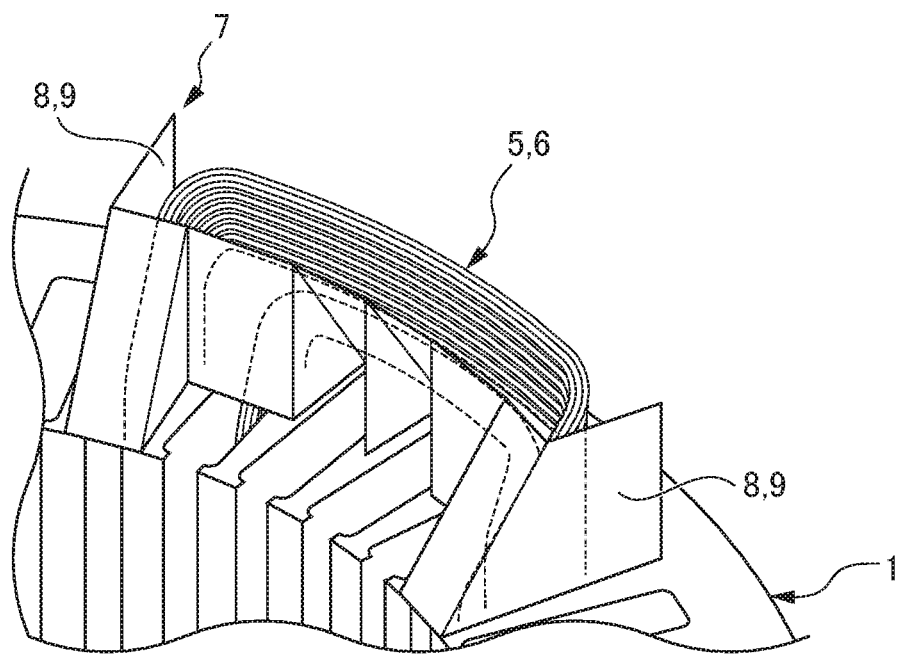
FIG. 5 is a perspective view showing a state of putting the interphase insulation paper of FIG. 2 over the coil ends of FIG. 3.
Figure 6:
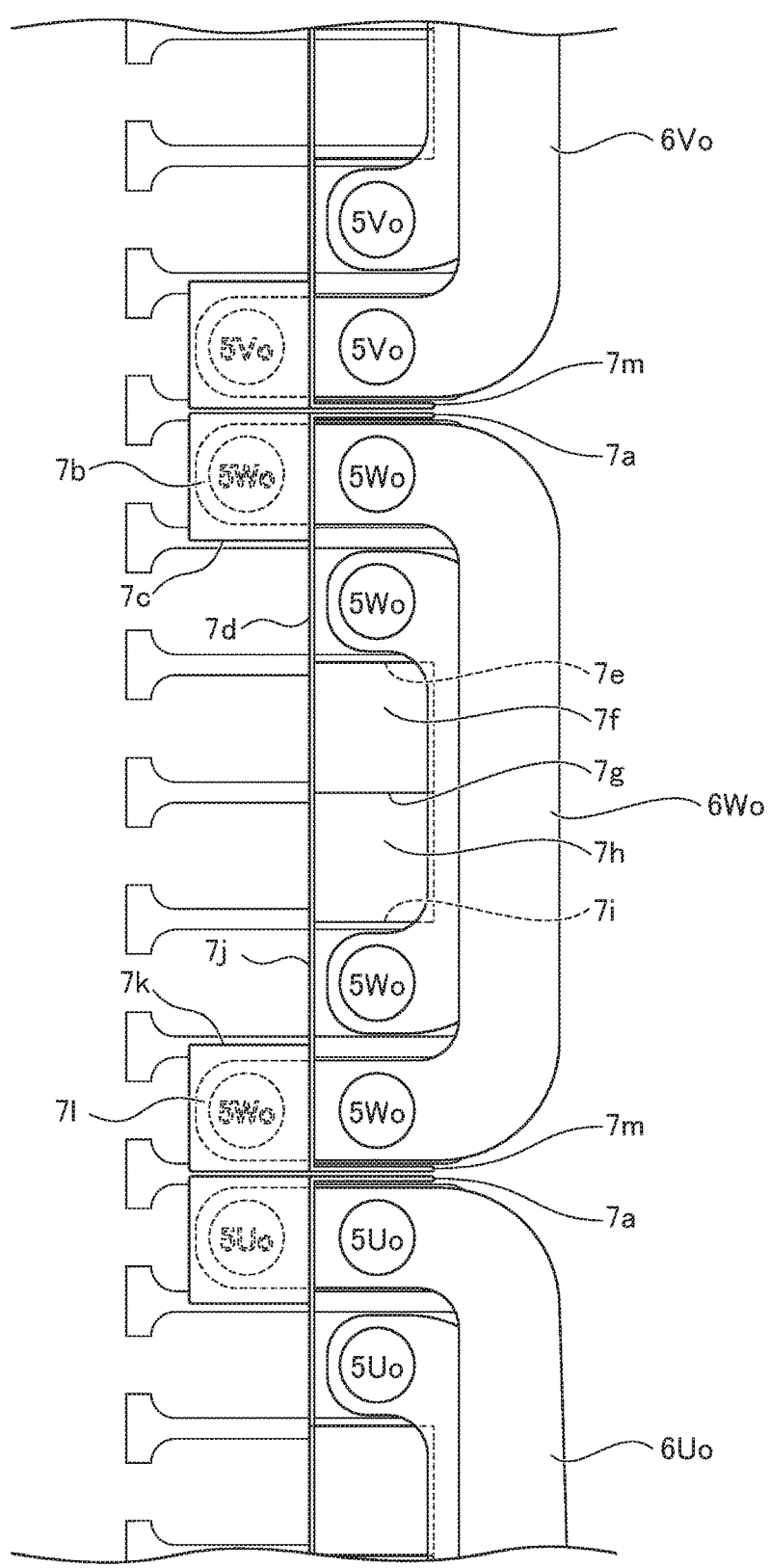
FIG. 6 is a view schematically showing the end coils of FIG. 5.

Next, in the second step, as shown in FIGS. 5 and 6, the interphase insulation paper 7 shown in FIG. 2 is arranged between the coil ends 6Uo, 6Vo and 6Wo of each phase. The interphase insulation paper 7 for the outer W-phase coil end 6Wo in FIG. 6 will be explained as an example. The first face 7a of the interphase insulation paper 7 is arranged in a region between the outer W-phase large coil 5Wo+5Wo, and the outer V-phase large coil 5Vo+5Vo of the adjacent outer V-phase coil end 6Vo. This first face 7a constitutes the parting strip 8. In this region, the thirteenth face 7m of the interphase insulation paper 7 for the outer V-phase coil end 6Vo is also arranged. This thirteenth face 7m also constitutes the parting strip 8. For this reason, the outer W-phase large coil 5Wo+5Wo and the outer V-phase large coil 5Vo+5Vo are interphase insulated by the first face 7a and thirteenth face 7m of two sheets of interphase insulation paper 7.

The second face 7b of the interphase insulation paper 7 is arranged so as to cover an oblique upper region that is an inner half of the outer W-phase large coil 5Wo+5Wo. The third face 7c is arranged so as to cover a right-side region that is an inner half of the outer W-phase large coil 5Wo+5Wo. The fourth face 7d is arranged so as to cover an inner region of the outer W-phase small coil 5Wo. The fifth face 7e is arranged so as to cover a right-side region of the outer W-phase small coil 5Wo. The sixth face 7f, seventh face 7 and eighth face 7h are described later.

The ninth face 7i is arranged so as to cover a left-side region of the outer W-phase small coil 5Wo. The tenth face 7j is arranged so as to cover the inner region of the outer W-phase small coil 5Wo. The eleventh face 7k is arranged so as to cover the left-side region that is the inner half of the outer W-phase large coil 5Wo+5Wo. The twelfth face 7l is arranged so as to cover an oblique upper region that is the inner half of the outer W-phase large coil 5Wo+5Wo.

The thirteenth face 7m is arranged in a region between the outer W-phase large coil 5Wo+5Wo, and the outer U-phase large coils 5Uo+5Uo of the adjacent outer U-phase coil end 6Uo. This thirteenth face 7m constitutes the parting strip 8. In this region, the first face 7a of the interphase insulation paper 7 for the outer U-phase coil end 6Uo is also arranged. This first face 7a also constitutes the parting strip 8. For this reason, the outer W-phase large coil 5Wo+5Wo and the outer U-phase large coil 5Uo+5Uo are interphase insulated by the first face 7a and thirteenth face 7m of two sheets of the interphase insulation paper 7. This similarly applies also for the interphase insulation paper 7 arranged at the outer U-phase coil end 6Uo and the interphase insulation paper 7 arranged at the outer V-phase coil end 6Vo.

Figure 7:
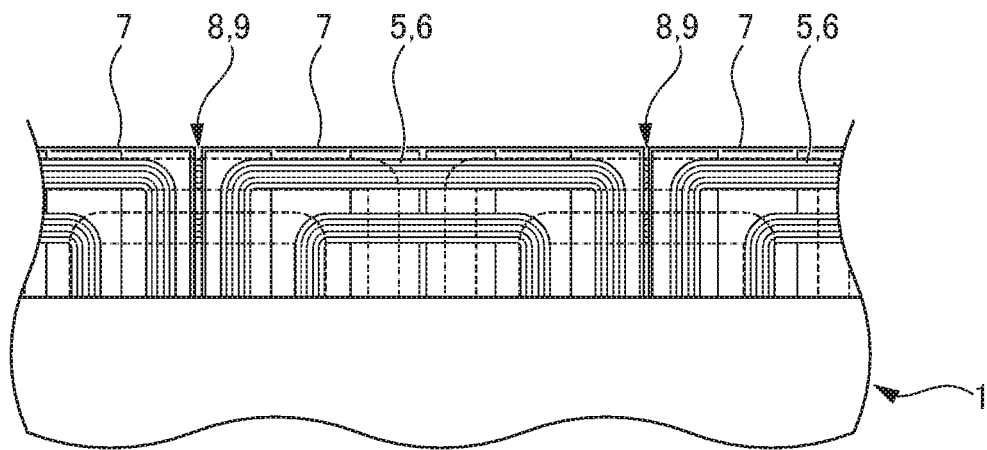
FIG. 7 is a lateral view of an aspect of the end coils of FIG. 5 adjoining in the circumferential direction.
Figure 8:
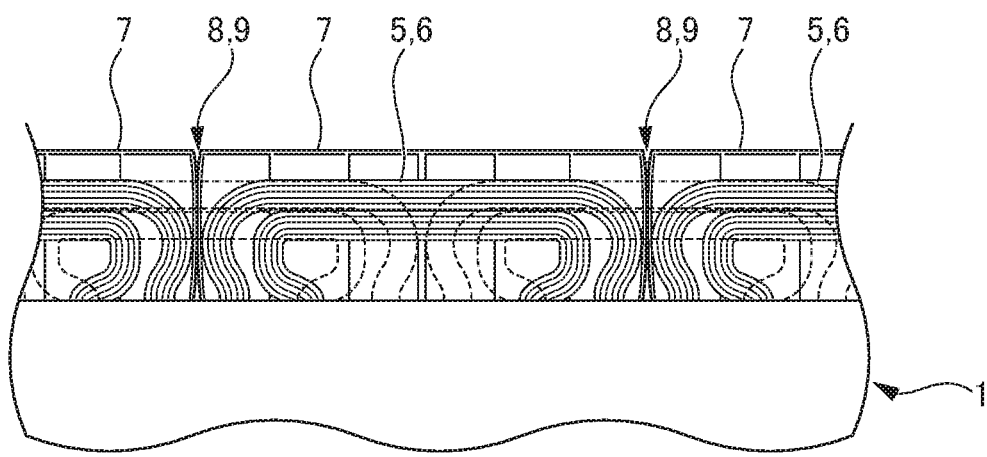
FIG. 8 is a view showing a state of sandwiching to fix both side parting strip of the interphase insulation paper by shaping the coil ends of FIG. 7.

Next, in the third step, the interphase insulation paper 7 is fixed as shown in FIG. 8. More specifically, in the second step, a state in which the interphase insulation paper 7 is inserted in the coil ends 6 of each phase is shown in FIG. 7. From this state, the coil ends 6 of each phase are shaped as shown in FIG. 8. The windings 5, 5 are thereby collapsed in the circumferential direction, and adjacent windings 5, 5 pinch the parting strips 8, 8, thereby fixing the interphase insulation paper 7. This similarly applies also for the interphase insulation paper 7 arranged at the outer U-coil end 6Uo and the interphase insulation paper 7 arranged at the outer V-phase coil end 6Vo.

Figure 9:
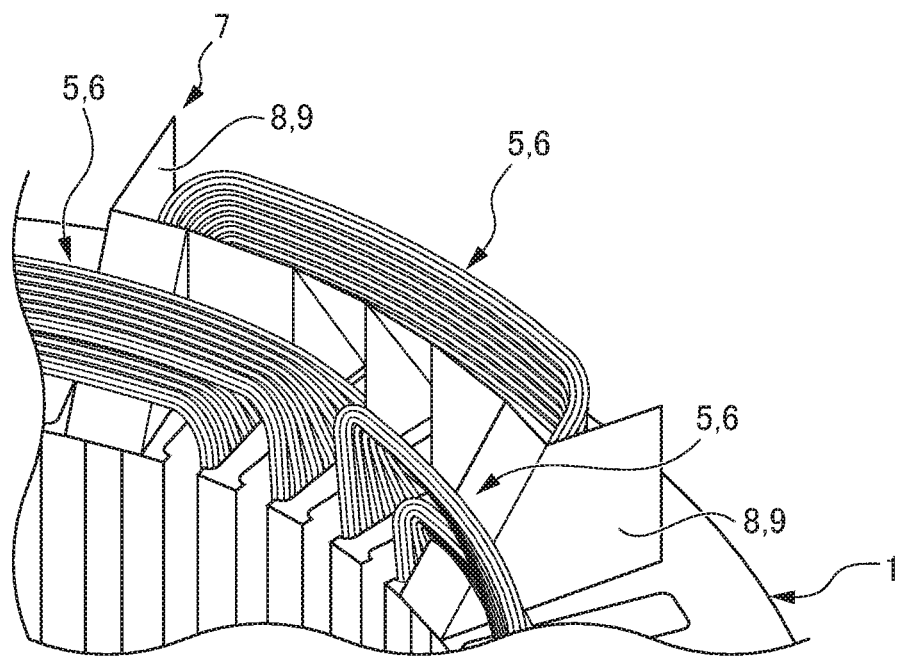
FIG. 9 is a perspective view adding the coil ends of the inner winding to the state shown in FIG. 8.

Next, in the fourth step, as shown in FIGS. 9 and 10, the inner U-phase large coil 5Ui+5Ui and the inner U-phase small coil 5Ui, the inner V-phase large coil 5Vi+5Vi and inner V-phase small coil 5Vi, and the inner W-phase large coil 5Wi+5Wi and inner W-phase small coil 5Wi are inserted into the slots 3. The interphase insulation paper 7 for the outer W-phase coil end 6Wo in FIG. 10 is explained as an example. The inner half of the outer W-phase large coil 5Wo+5Wo and the inserted inner U-phase small coil 5Ui are interphase insulated by the second face 7b and third face 7c of the interphase insulation paper 7. The inner side of the outer W-phase small coil 5Wo and outer side of the inserted inner U-phase small coil 5Ui are interphase insulated by the fourth face 7d of the interphase insulation paper 7. The outer W-phase small coil 5Wo and the inserted inner U-phase large coil 5Ui+5Ui are interphase insulated by the fifth face 7e and sixth face 7f of the interphase insulation paper 7. The inserted inner U-phase large coil 5Ui+5Ui and the inserted inner V-phase large coil 5Vi+5Vi are interphase insulated by the seventh face 7g of the interphase insulation paper 7. The outer W-phase small coil 5Wo and the inserted inner V-phase large coil 5Vi+5Vi are interphase insulated by the eighth face 7h and ninth face 7i of the interphase insulation paper 7. The inner side of the outer W-phase small coil 5Wo and the outer side of the inserted inner V-phase small coil 5Vi are interphase insulated by the tenth face 7j of the interphase insulation paper 7. The inner half of the outer W-phase large coil 5Wo+5Wo and the inserted inner V-phase small coil 5Vi are interphase insulated by the eleventh face 7k and twelfth face 7l of the interphase insulation paper 7.

Then, at this time, the coil ends 6 of each phase are shaped so that all of the coil ends 6 are brought into an appropriate shape. This is omitted from illustration.

According to the method for producing a motor according to the first embodiment, due to fixing by pinching the parting strip 8 of the interphase insulation paper 7 by windings 5, 5 of adjacent phases, it is possible to automatically insert the interphase insulation paper 7 in the coil ends 6 without the space factor of the windings 5 declining.

Next, a method for producing a motor according to a second embodiment will be explained. The motor produced by the method for producing a motor according to the second embodiment is also the motor 10 explained above. In other words, the motor 10 includes the stator core 1 laminated with an electromagnetic steel sheet 2, and having a plurality of slots 3 and teeth 4, and windings 5 inserted into the distributed windings of three phases in the slots 3. The windings 5 are made into distributed windings of three phases consisting of the two layers of the outer and inner side, and are inserted into the slots 3 by dividing into the two of an outer winding and inner winding. An interphase insulation paper 7 is inserted into the coil ends 6 formed thereby.

As shown in FIGS. 3, 7, 8, and 11 to 16, the method for producing a motor according to the first embodiment includes: a first step of inserting an outer winding 5 into the slots 3 of the stator core 1; a second step of greatly collapsing the coil ends 6 of each phase formed in the first step, and inserting the inner winding 5 into the slots 3 of the stator core 1; a third step of inserting the interphase insulation paper 7 that is shaped so as to match the coil ends 6 of each phase formed in the first step and the second step, into both the outer winding 5 and the inner winding 5 for the coil ends 6 of each phase, the interphase insulation paper 7 having a parting strip 8 between windings 5, 5 that are adjacent in the circumferential direction when inserted in the coil end 6 and; a fourth step of fixing the interphase insulation paper 7 by the windings 5, 5 being collapsed in the circumferential direction by way of shaping the coil end 6, and pinching the parting strip 8 by the windings 5, 5 that are adjacent.

Figure 11:
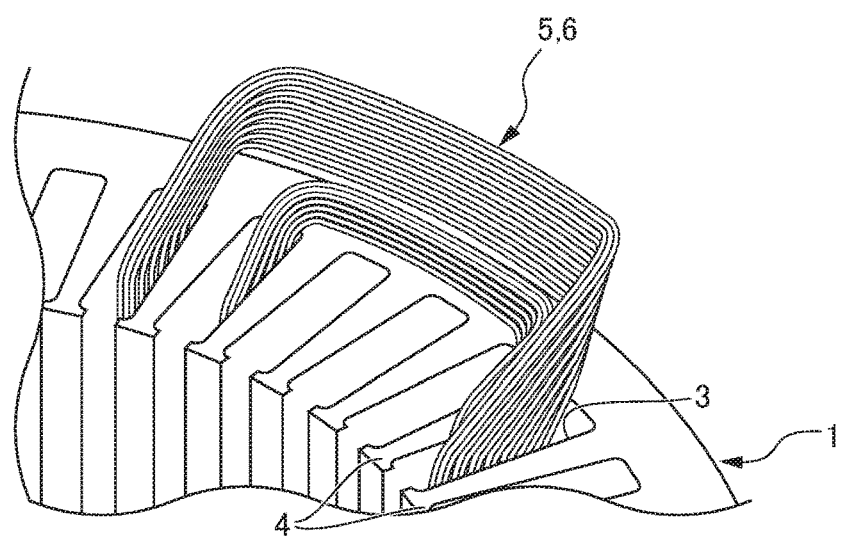
FIG. 11 is a perspective view showing a state of shaping so as to move the coil ends of FIG. 3 further to the outside, in a second embodiment of a method for producing the motor of FIG. 1.
Figure 12:
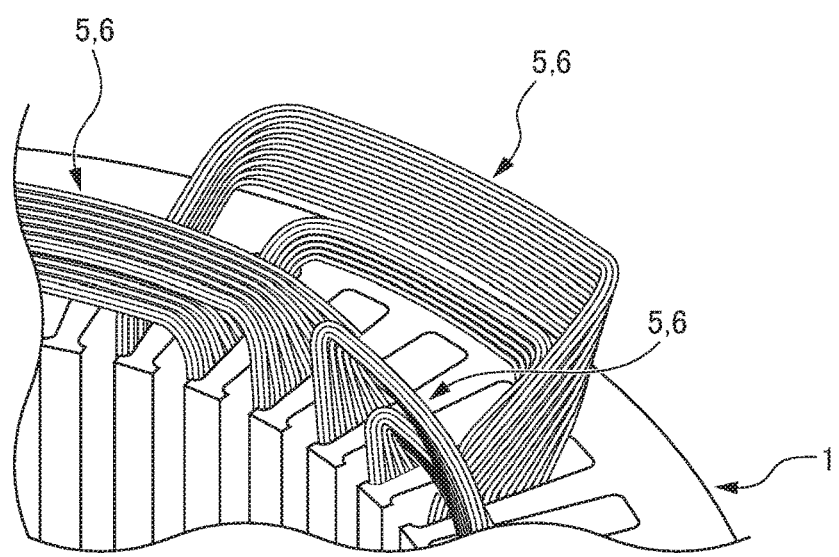
FIG. 12 is a perspective view adding the coil ends of the inner windings to the coil ends of the state in FIG. 11.
Figure 13:
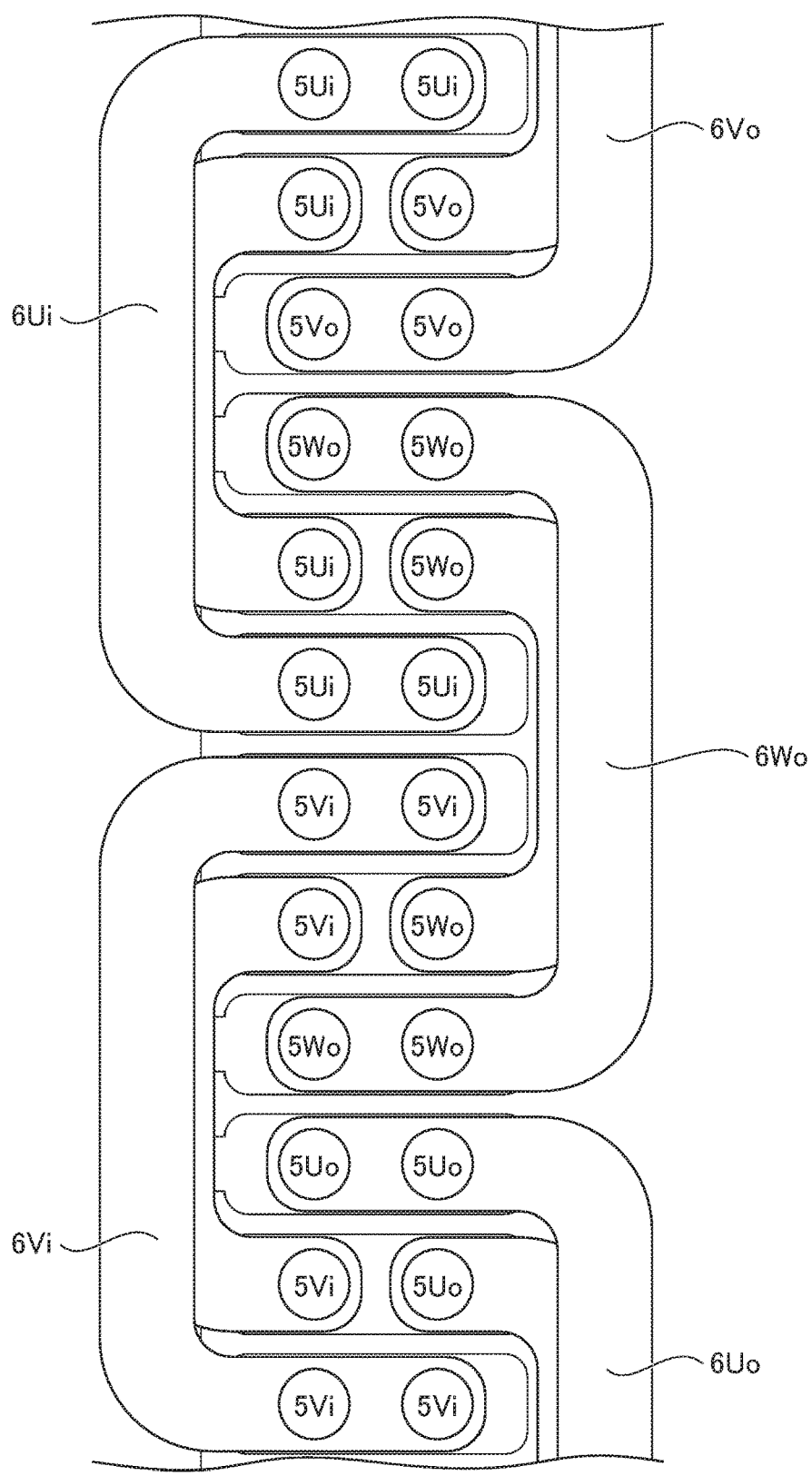
FIG. 13 is a view schematically showing the coil ends of FIG. 12.

More specifically, in the first step, the outer winding 5 is inserted in the slots 3 of the stator core 1 as shown in FIG. 3. Next, in the second step, the coil ends 6 of each phase formed in the first step are greatly collapsed to the outside, as shown in FIG. 11. Then, the inner winding 5 is inserted in the slots 3 of the stator core 1, as shown in FIG. 12. The inserted state is shown in FIG. 13.

Figure 14:
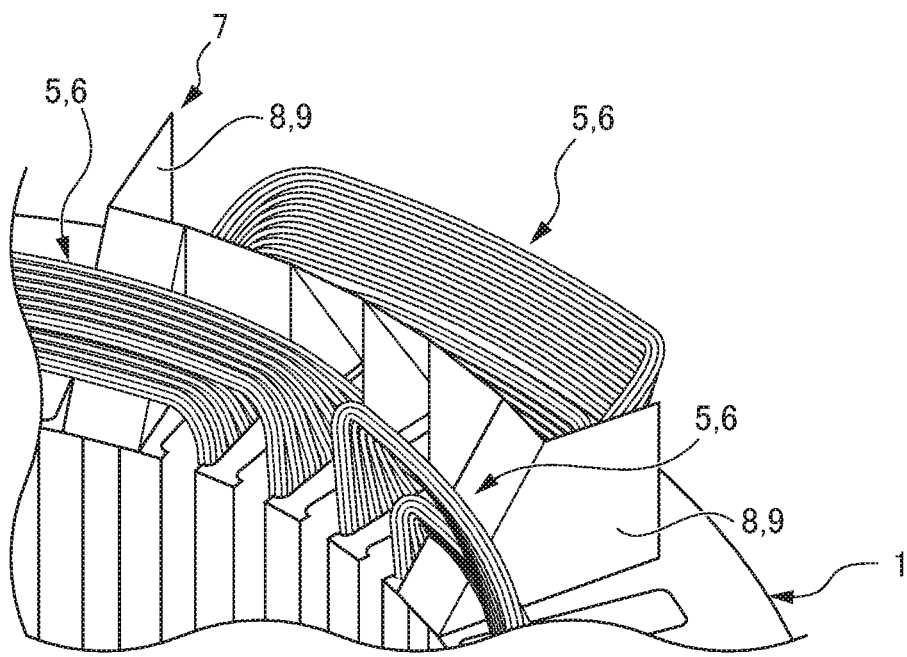
FIG. 14 is a perspective view showing a state of inserting the interphase insulation paper of FIG. 2 to the coil ends of the outer windings in FIG. 12.
Figure 15:
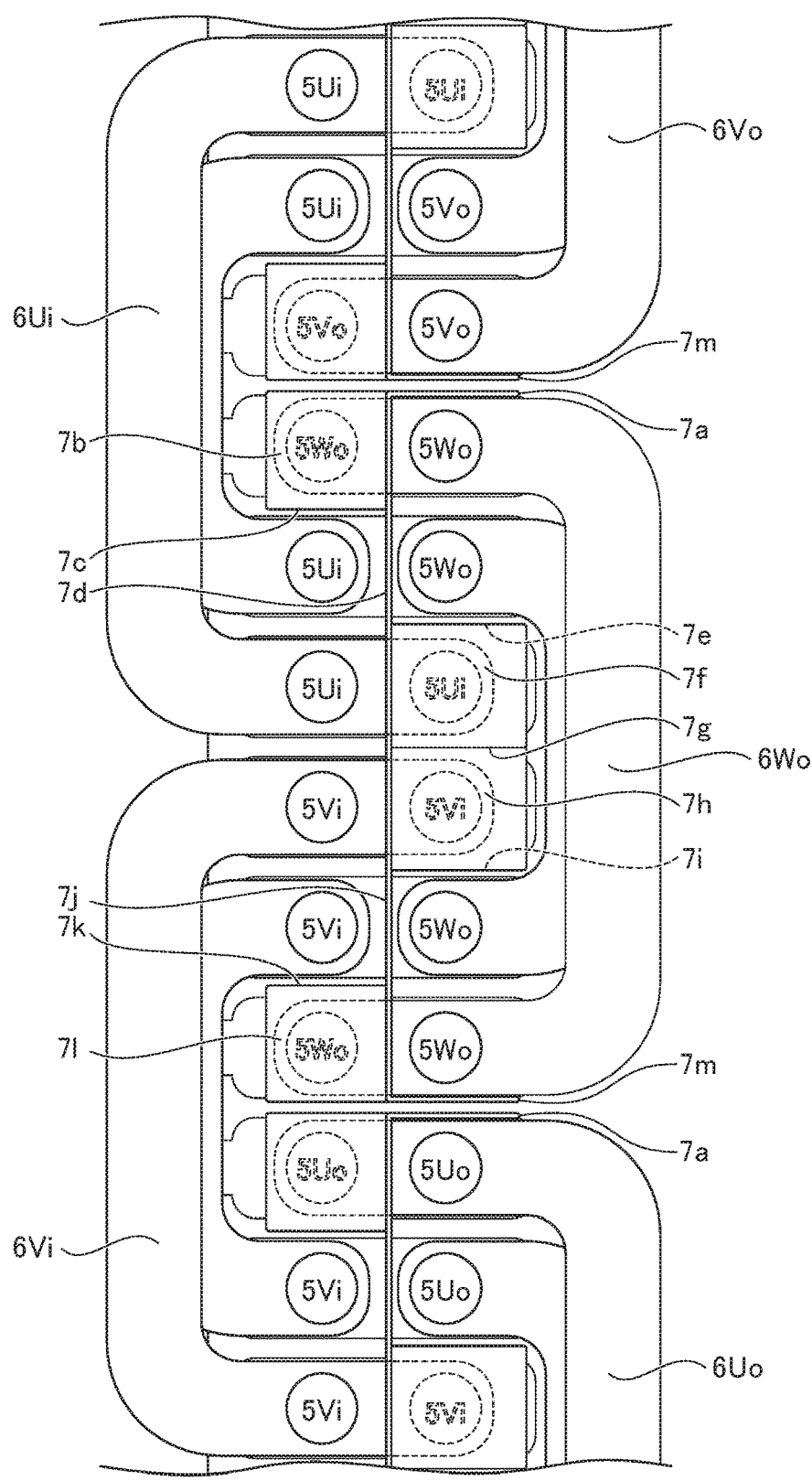
FIG. 15 is a view schematically showing the coil ends of FIG. 14.

Next, in the third step, the interphase insulation paper 7 shown in FIG. 2 is inserted to both the outer winding 5 and inner winding 5 of the coil ends 6 of each phase, as shown in FIG. 14. It may be inserted in advance from either outer or inner, for example, and the case of inserting the interphase insulation paper 7 in advance from the outer winding 5 is shown in FIG. 15. FIG. 15 is a drawing resembling FIG. 10, and the explanation is omitted herein by invoking the explanation for FIG. 10.

Figure 16:
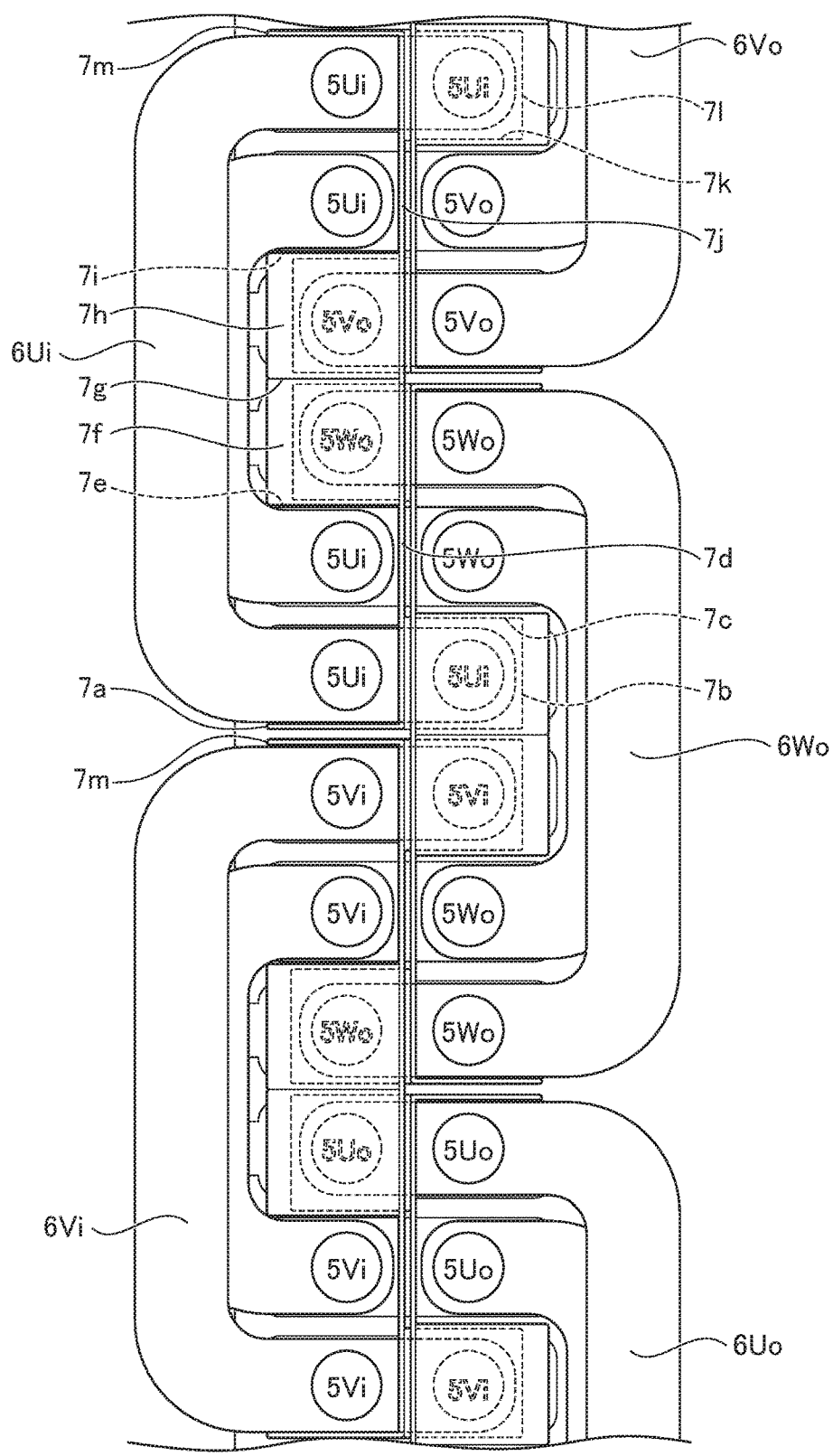
FIG. 16 is a perspective view showing a state of further inserting the interphase insulation paper of FIG. 2 into the coil ends of the inner windings in FIG. 12.

Next, as shown in FIG. 16, the interphase insulation paper 7 is inserted also in the inner winding 5. The interphase insulation paper 7 for the inner U-phase coil end 6Ui is indicated by assigning reference symbols for the first face 7*a* to thirteenth face 7*m*. In FIG. 16, the interphase insulation paper 7 for the outer W-phase coil end 6Wo and the interphase insulation paper 7 for the inner U-phase coil end 6Ui are at positions shifted by half from each other along the circumferential direction (vertical direction in FIG. 16), in a back-to-back orientation with each other.

There are two points of difference between the interphase insulation paper arrangement shown in FIG. 15 and the interphase insulation paper arrangement shown in FIG. 16. First, in the case of the interphase insulation paper arrangement shown in FIG. 15, the interphase insulation paper 7 arranged at the positions of each face for the second face 7*b* to twelfth face 7*l* is one sheet for all thereof. In contrast, in the case of the interphase insulation paper arrangement shown in FIG. 16, the interphase insulation paper arranged at the positions of each face for the second face 7*b* to twelfth face 7*l* is all two sheets stacked. For this reason, in the case of the interphase insulation paper arrangement shown in FIG. 16, the insulation performance improves by that amount. The other one is, in the case of the interphase insulation paper arrangement shown in FIG. 15, none of the faces among the first face 7*a* to thirteenth face 7*m* of the interphase insulation paper 7 is arranged between the region that is the inner half of the inner U-phase large coil 5Ui+5Ui for the inner U-phase coil end 6Ui, and the region that is the inner half of the inner V-phase large coil 5Vi+5Vi for the adjacent inner V-phase coil end 6Vi. For this reason, in the case of the interphase insulation paper arrangement shown in FIG. 15, it is difficult to say that the insulation performance of this region is perfect. This is also a point of difference between the method for producing a motor according to the first embodiment, and the method for producing a motor according to the second embodiment.

Next, in the fourth step, the interphase insulation paper 7 is fixed as shown in FIG. 8. More specifically, in the third step, the state of the interphase insulation paper 7 being inserted in the coil ends 6 of each phase is shown in FIG. 7. From this state, the coil ends 6 of each phase are shaped as shown in FIG. 8. The windings 5, 5 are thereby collapsed in the circumferential direction, and adjacent windings 5, 5 pinch the parting strips 8, 8, thereby fixing the interphase insulation paper 7. This similarly applies also for the interphase insulation paper 7 arranged at the outer U-phase coil end 6Uo and the interphase insulation paper 7 arranged at the outer V-phase coil end 6Vo.

Then, at this time, the coil ends 6 of each phase are shaped so that all of the coil ends 6 are brought into an appropriate shape. This is omitted from illustration.

According to the method for producing a motor according to the second embodiment, due to fixing by pinching the parting strip 8 of the interphase insulation paper 7 by windings 5, 5 of adjacent phases, it is possible to automatically insert the interphase insulation paper 7 in the coil ends 6 without the space factor of the windings 5 declining.

In the methods for producing a motor according to the above-mentioned first and second embodiments, the interphase insulation paper 7 is separated into each phase. In other words, the respective interphase insulation paper 7 is inserted into every coil end 6 of adjacent phases in the circumferential direction. In such a case, the interphase insulation paper 7, 7, . . . for coil ends 6 adjacent in the circumferential direction may be configured so as to be connected to each other via the appropriate connecting parts 9, 9, . . . . For example, as shown in FIG. 5, it is possible to provide an appropriate connecting part 9 that connects the parting strips 8, 8 at the positions of the parting strips 8 in the interphase insulation paper 7. The connecting part 9 may be provided to the insertion side, counter-insertion side or the like of the interphase insulation paper 7.

In the case of the interphase insulation paper 7 having the connecting part 9, the adjacently inserted interphase insulation paper 7, 7, . . . is connected via the connecting parts 9, 9, . . . , whereby a plurality of the interphase insulation paper 7, 7, . . . becomes one body. For this reason, it is possible to insert a plurality of the interphase insulation paper 7, 7, . . . into a plurality of insertion locations simultaneously, by inserting this integrated interphase insulation paper 7, 7, . . . at once into a predetermined position, and thus it is possible to shorten the time required in insertion.

Although embodiments of the present invention have been explained above, the present invention is not to be limited to the aforementioned embodiments, and modifications and improvements within a scope that can achieve the object of the present invention are also included in the present invention. In addition, the effects described in the present embodiments are merely listing the most preferred effects produced from the present invention, and the effects according to the present invention are not to be limited to those described in the present embodiments.

EXPLANATION OF REFERENCE NUMERALS

1 stator core
2 electromagnetic steel sheet
3 slot
4 tooth
5 winding
6 coil end
7 interphase insulation paper
8 parting strip
9 connecting part
10 motor

What is claimed is:
1. A motor comprising:
a stator core laminated with an electromagnetic steel sheet, and having a plurality of slots; and
windings that are inserted in a winding distribution of three phases into the slots, wherein
interphase insulation papers are inserted into respective ones of coil ends,
the interphase insulation papers each have at least one parting strip in at least one respective end portion, the parting strip partitioning a boundary between windings that are adjacent in a circumferential direction of the stator core when inserted into the respective coil end, the interphase insulation papers each have a surface that separates respective ones of the windings when viewed from an end surface of the stator core and a sloped surface capable of separating the windings along an axial direction of the stator core, the parting strips are sandwiched between the windings that are adjacent in a circumferential direction of the stator core, and the interphase insulation papers are each separated into a respective one of the three phases.

2. The motor according to claim 1, wherein the surface that separates respective ones of the windings when viewed from an end surface of the stator core is a vertical surface, and the sloped surface is capable of separating the windings along a radial direction of the stator core.

* * * * *